US006998854B2

(12) United States Patent
Yamagishi

(10) Patent No.: US 6,998,854 B2
(45) Date of Patent: Feb. 14, 2006

(54) BURIED STRUCTURE DETECTION DEVICE

(75) Inventor: Junichi Yamagishi, Taito-ku (JP)

(73) Assignees: Unirec Co., Ltd., Tokyo (JP); Junichi Yamaguchi, Tokyo (JP)

( * ) Notice: Subject to any disclaimer, the term of this patent is extended or adjusted under 35 U.S.C. 154(b) by 0 days.

(21) Appl. No.: 10/491,869

(22) PCT Filed: Dec. 19, 2001

(86) PCT No.: PCT/JP01/11127

§ 371 (c)(1),
(2), (4) Date: Apr. 7, 2004

(87) PCT Pub. No.: WO03/034094

PCT Pub. Date: Apr. 24, 2003

(65) Prior Publication Data

US 2004/0239328 A1    Dec. 2, 2004

(30) Foreign Application Priority Data

Oct. 9, 2001    (JP)    .............................. 2001-311168

(51) Int. Cl.
*G01R 27/26* (2006.01)
(52) U.S. Cl. .................... 324/658; 324/326; 324/686
(58) Field of Classification Search ........ 324/658–663, 324/686, 519, 92
See application file for complete search history.

(56) References Cited

U.S. PATENT DOCUMENTS

| 4,992,741 A | * | 2/1991 | Douglas et al. ............. 324/671 |
| 5,617,031 A | * | 4/1997 | Tuttle ......................... 324/326 |
| 6,097,190 A | * | 8/2000 | Foerster ...................... 324/329 |
| 6,326,790 B1 | * | 12/2001 | Ott et al. ..................... 324/327 |
| 6,486,673 B1 | * | 11/2002 | Goldfine et al. ............ 324/326 |

FOREIGN PATENT DOCUMENTS

| JP | 7-2987 | 1/1995 |
| JP | 9-33194 | 2/1997 |
| JP | 2000-266843 | 9/2000 |
| JP | 2001-264448 | 9/2001 |

* cited by examiner

*Primary Examiner*—Vincent Q. Nguyen
*Assistant Examiner*—Marina Kramskaya
(74) *Attorney, Agent, or Firm*—Jordan and Hamburg LLP

(57) ABSTRACT

An underground buried object detecting apparatus has a capacitance sensor attached to a base plate to be faced to the ground, to detect an underground capacitance change, a stored value of a reference capacitance corresponding to the absence of a buried object, a comparing operation device for comparing detected capacitance with the stored capacitance value, and a buzzer for receiving a signal from the operation device and indicating presence of a buried object.

7 Claims, 7 Drawing Sheets

BURIED STRUCTURE DETECTION DEVICE

TECHNICAL FIELD

The present invention relates to an underground buried object detecting apparatus to detect underground buried objects such as mines according to capacitance changes.

BACKGROUND TECHNOLOGY

A conventional underground buried object detecting apparatus is disclosed in, for example, Japanese Unexamined Patent Application Publication No. 2000-266843. This conventional underground buried object detecting apparatus is a mine detector having an underground probing radar that employs electromagnetic waves to detect mines buried underground. This mine detector can detect mines with electromagnetic waves at high accuracy.

The above-mentioned conventional mine detector, however, employs electromagnetic waves to limit the material of detectable mines. It has a problem of incapability of detecting mines made of, for example, resin.

It has another problem that it cannot be used for mines that are formed to explode in response to electromagnetic waves.

DISCLOSURE OF INVENTION

A first object of the present invention is to provide an underground buried object detecting apparatus capable of correctly detecting target buried objects irrespective of the material of the target buried objects to detect. A second object thereof is to provide an underground buried object detecting apparatus that is effectively usable for mines that explode in response to electromagnetic waves.

To achieve the objects of the present invention, there is provided an underground buried object detecting apparatus having a capacitance sensor attached to a base plate to be faced to the ground, to detect an underground capacitance change, reference value storing means for prestoring a reference capacitance according to a capacitance change when no target buried object is present in the ground, operation means for comparing the detected capacitance change with the stored capacitance and detecting the presence of a target buried object in the ground, and information means for receiving a signal from the operation means and informing of the presence of the target buried object.

The capacitance sensor includes a measuring electrode and a ground electrode each made of an annular conductive metal plate concentrically arranged on a bottom face of the base plate.

Further, the capacitance sensor has integral terminals passing through the base plate. The terminals are electrically connected to a circuit arranged on a top face of the base plate.

On the bottom face of the base plate, a nonconductive resin material is arranged to cover the capacitance sensor.

The information means is a buzzer to receive the signal from the operation means and inform of the presence of the target buried object with a warning sound.

BEST MODE OF IMPLEMENTATION

Figure 1:
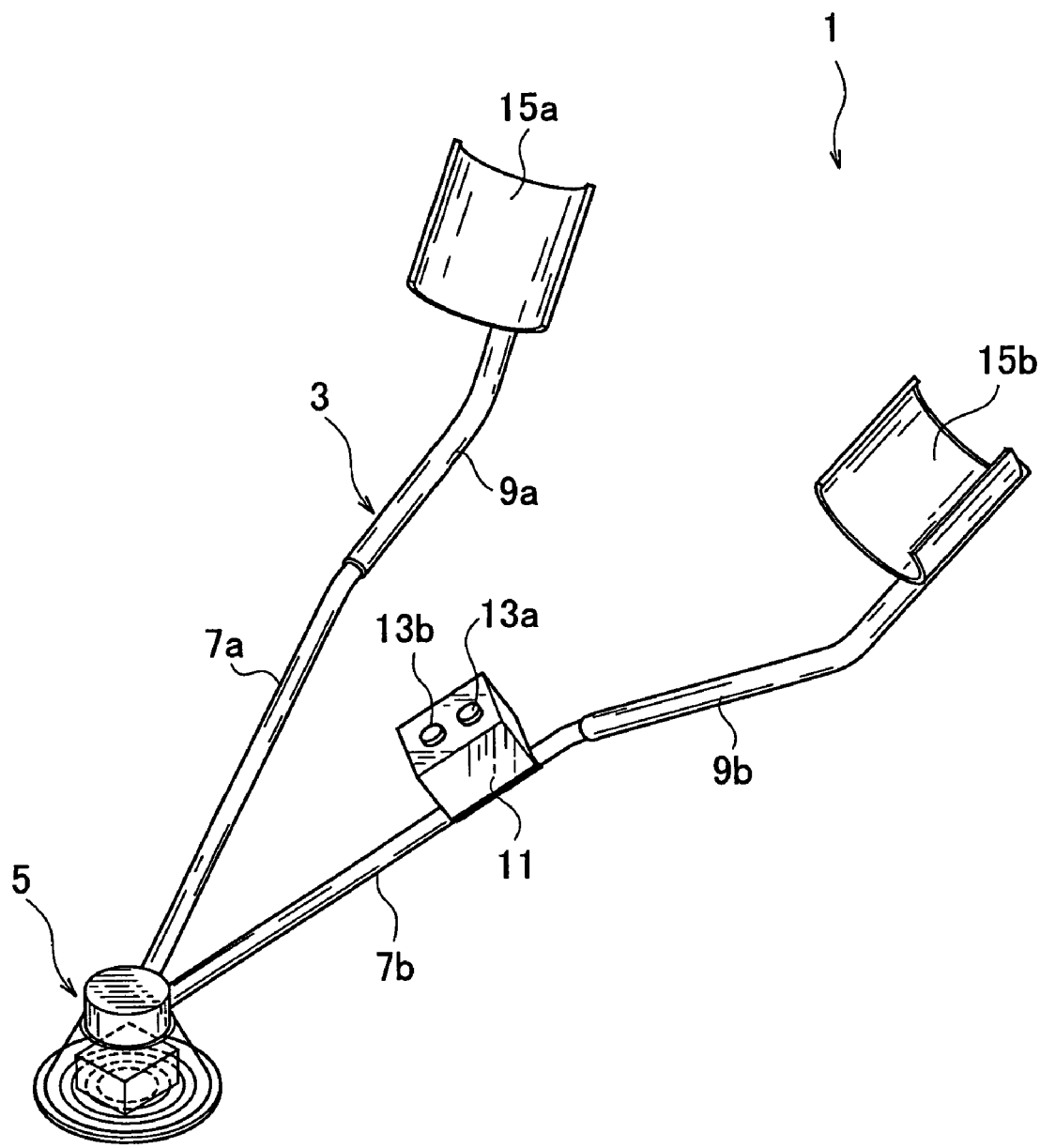
FIG. 1 is a perspective view showing an underground buried object detecting apparatus according to an embodiment of the present invention.

FIG. 1 is a perspective view showing a mine detector as an embodiment of an underground buried object detecting apparatus of the present invention. The mine detector 1 of FIG. 1 has a handling part 3 and a detecting part 5.

The handling part 3 includes support rods 7a and 7b and handling rods 9a and 9b. The support rods 7a and 7b consist of pipes made of light metal such as aluminum, resin, etc. One support rod 7b is provided with an operation box 11. The operation box 11 accommodates a power source consisting of a small battery, a fuel cell, or a fuel battery, etc. On the surface of the operation box 11, there are operation buttons 13a and 13b to operate ON/OFF switches. The ON/OFF switches are connected to the power source in the operation box 11.

The handling rods 9a and 9b consist of pipes made of light metal such as aluminum, resin, etc., and are fitted and fixed to rear ends of the support rods 7a and 7b. Rear ends of the handling rods 9a and 9b are provided with arm rests 15a and 15b made of light metal such as aluminum, resin, etc.

The handling part 3 may be provided with a shoulder part to be hung from and supported by the shoulder of a worker. In this case, a balancer may be arranged to balance with the weight of the handling part 3 and detecting part 5 on each side of the worker. When the shoulder part is hung on the shoulder of the worker, the balancer may balance with the weight of the handling part 3 and detecting part 5, so that the detecting part 5 may stably face the ground.

Figure 2:
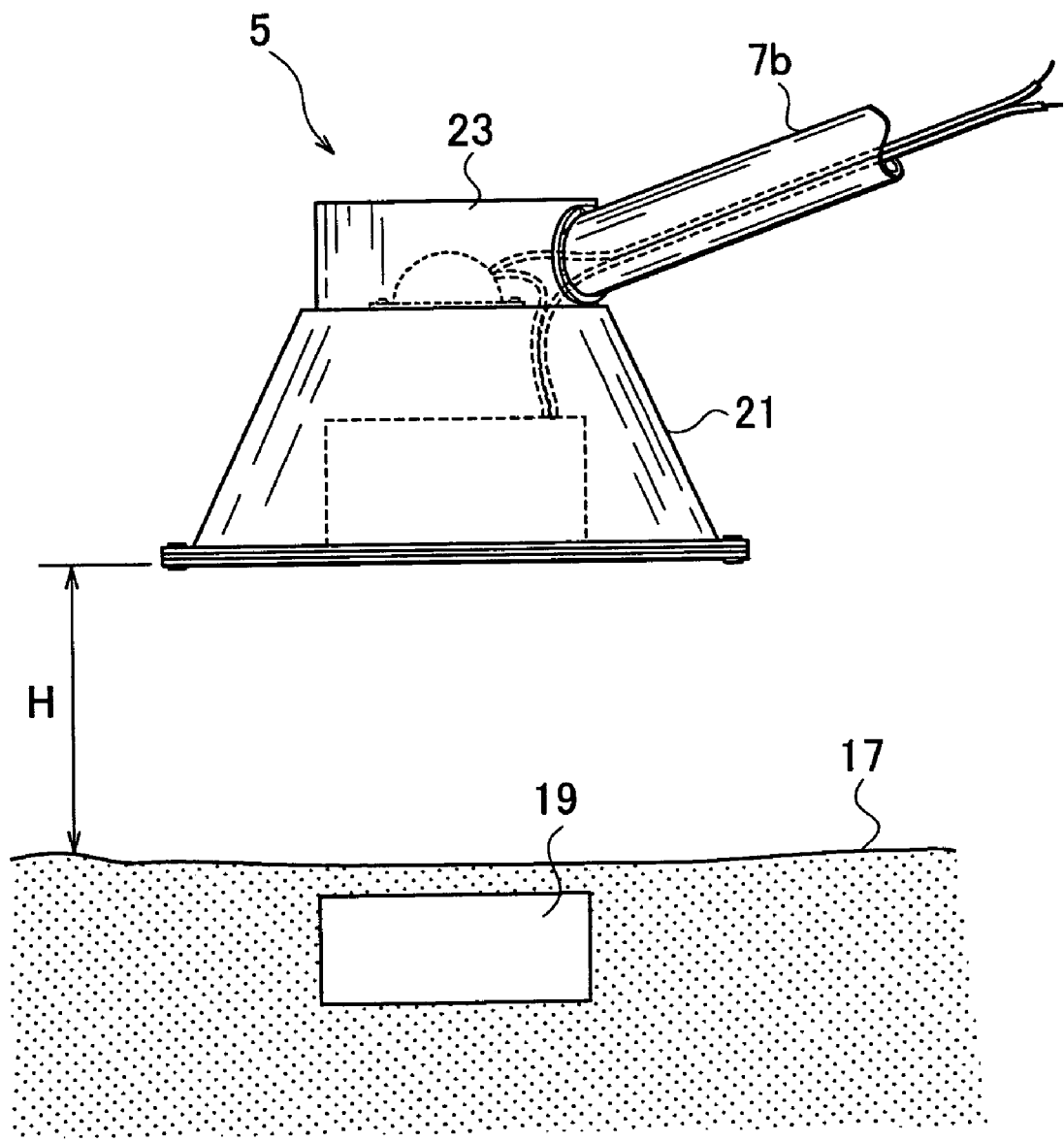
FIG. 2 is a side view showing essential parts and a relationship between a detecting part and the ground according to the embodiment.
Figure 4:
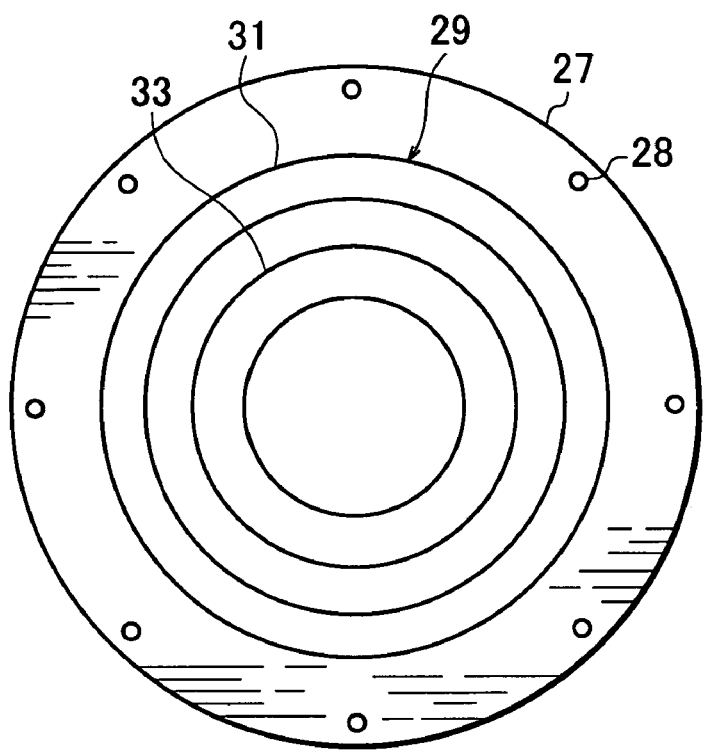
FIG. 4 is a bottom view showing a base plate according to the embodiment.
Figure 5:
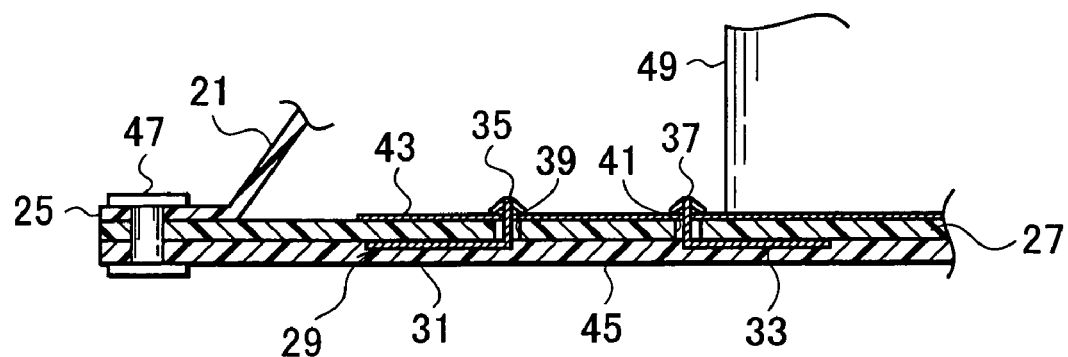
FIG. 5 is an enlarged sectional view showing essential parts according to the embodiment.

The details of the detecting part 5 will be explained with reference to FIGS. 2 to 5. FIG. 2 is a side view showing a relationship between the detecting part 5 and the ground 17, FIG. 3 is a partly broken enlarged side view partly showing the detecting part 5, FIG. 4 is a bottom view showing a base plate, and FIG. 5 is an enlarged sectional view showing essential parts.

In FIG. 2, the detecting part 5 keeps a height H=30 mm to 40 mm from the ground 17, to detect a target buried object 19. According to this embodiment, the target buried object 19 is a mine. The height H is optionally selectable depending on a sensing capacity. The detecting part 5 has a housing 21 and a head part 23.

The housing 21 is made of, for example, aluminum and is formed in a truncated conical shape. The head part 23 is made of, for example, aluminum and is fixed to a top face of the housing 21 with screws, adhesive, etc. To the head part 23, front ends of the support rods 7a and 7b are fixed with, for example, screws through a flange.

Figure 3:
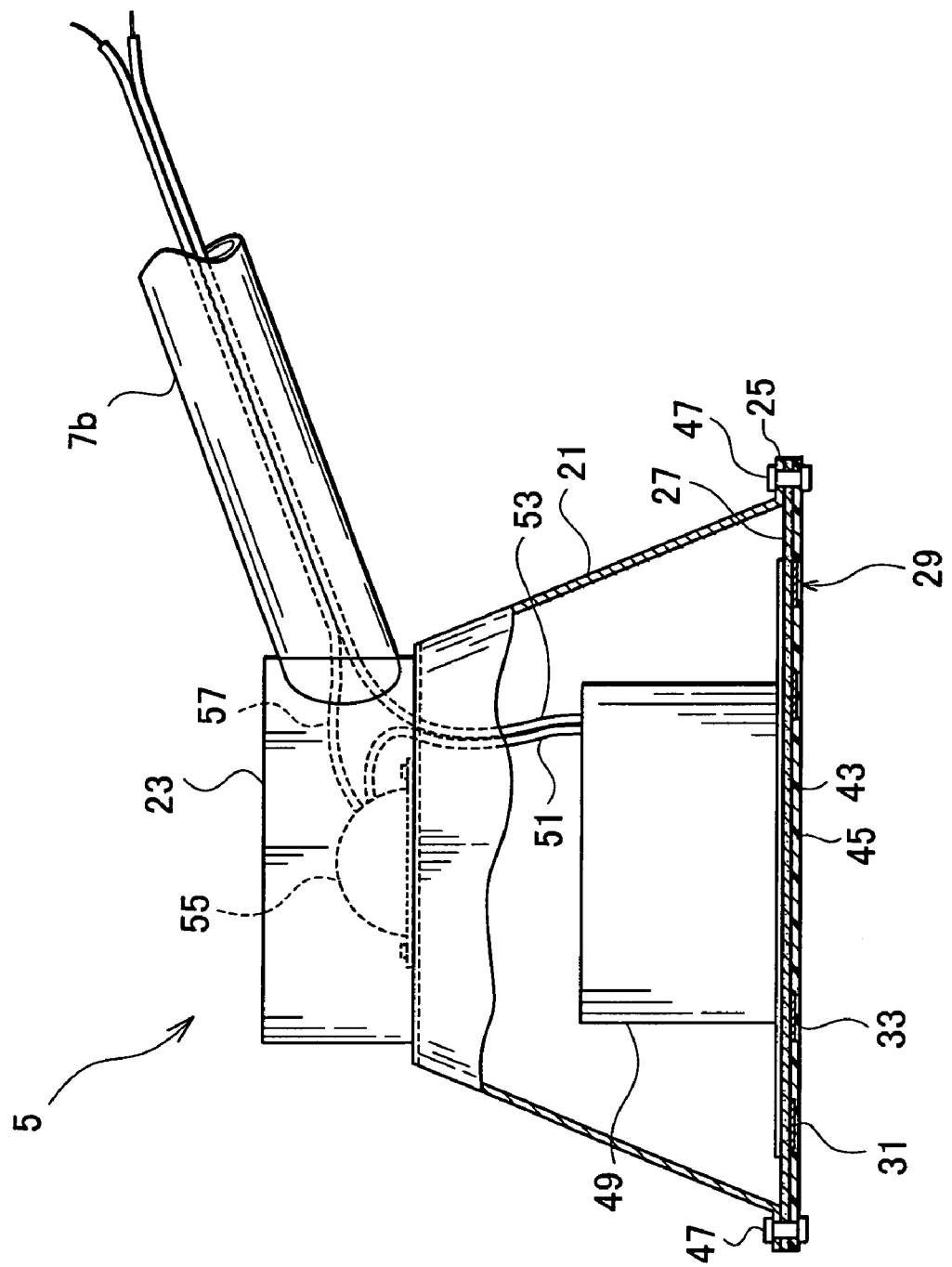
FIG. 3 is a partly broken enlarged view showing essential parts of the detecting part.

At a lower end of the housing 21, a flange part 25 is circumferentially arranged as shown in FIG. 3. At the lower end of the housing 21, the base plate 27 is arranged. The base plate 27 has a disk shape as shown in FIG. 4. An outer periphery thereof is provided with a plurality of through holes 28 for fastening at given intervals. The outer periphery of the base plate 27 abuts against the flange part 25 of the housing 21.

The base plate 27 is faced to the ground 17. A bottom face thereof is provided with a capacitance sensor 29 to detect a capacitance change in the ground. The capacitance sensor 29 consists of a conductive metal thin plate made of, for example, copper and includes a measuring electrode 31 and a ground electrode 33. These electrodes are annular and are concentrically arranged on the bottom face of the base plate 27. The measuring electrode 31 and ground electrode 33 may consist of conductive metal foils made of, for example, copper.

The measuring electrode 31 and ground electrode 33 of the capacitance sensor 29 are provided with integral terminal parts 35 and 37 as shown in FIG. 5. The terminal parts 35 and 37 rise toward the base plate 27, pass through the through holes 39 and 41 formed in the base plate 27, and protrudes from the top face of the base plate 27. On the top face of the base plate 27, a circuit 43 is formed by, for example, printing. The terminal parts 35 and 37 are electrically connected to the circuit 43 by, for example, soldering.

On the bottom face of the base plate 27, a resin plate 45 made of nonconductive resin material is fitted to cover the measuring electrode 31 and ground electrode 33 of the capacitance sensor 29. The resin plate 45 has a disk shape whose diameter is the same as that of the base plate 27.

The base plate 27 and resin plate 45 are laid on the flange part 25 of the housing 21, and they are fastened and fixed together with fastening members 47 such as rivets, bolts and nuts, etc., at given circumferential intervals. Instead of the resin plate 45, the bottom face of the base plate 27 may be covered with a resin mold.

The top face of the base plate 27 is provided with a controller 49. The controller 49 is electrically connected to the circuit 43 mentioned above. The controller 49 is connected to a signal line 51 and a power source line 53. The signal line 51 is connected to a buzzer 55 serving as a information unit arranged in the head 23. The power source line 53 is passed through the housing 21, the head part 23, the support rod 7b, and the ON/OFF switches in the operation box 11 and is connected to a power source.

In the head part 23, the buzzer 55 is fixed to the top face of the housing 21 with, for example, screws. The buzzer 55 is connected to a power source line 57, which is passed through the support rod 7b and the ON/OFF switches in the operation box 11 and is electrically connected to the power source.

Figure 6:
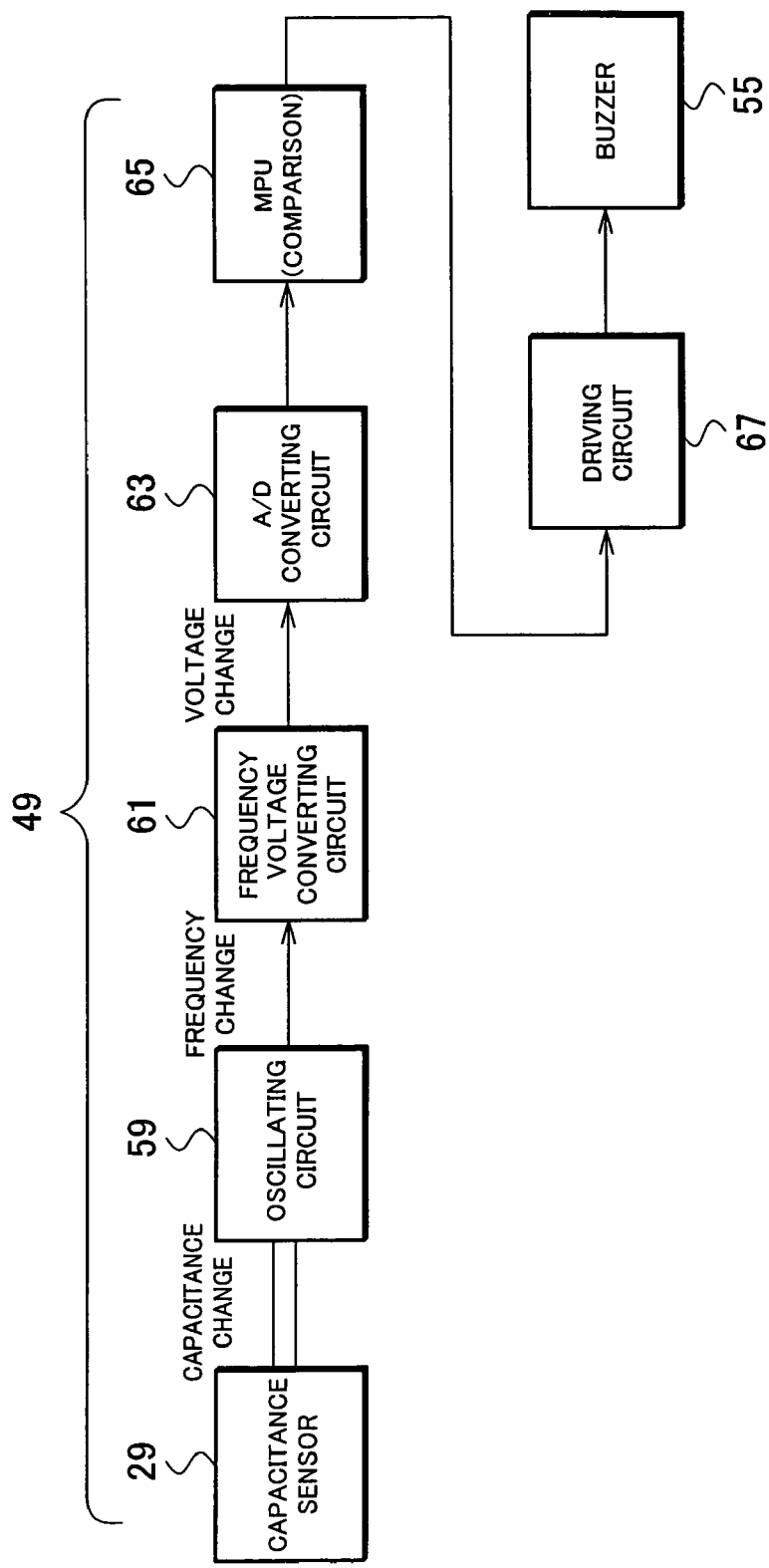
FIG. 6 is a block diagram showing a controller according to the embodiment.

The controller 49 is formed as shown in the block diagram of FIG. 6. The controller 49 has the capacitance sensor 29, an oscillating circuit 59, a frequency voltage converting circuit 61, an A/D converting circuit 63, and an MPU 65. The controller 49 is connected to the buzzer 55 through a driving circuit 67.

The MPU 65 prestores a reference capacitance according to a capacitance change when the target buried object 19 is not in the ground. Namely, according to the embodiment, the MPU 65 forms the reference value storing means. The MPU 65 compares a detected capacitance change with the stored capacitance change and detects the presence of the target buried object 19 in the ground. Namely, according to the embodiment, the MPU 65 also forms the operation means.

In an underground buried object detecting work, the ON operation button 13a is pushed to activate the detector. Then, a worker puts his or her elbows on the arm rests 15a and 15b, grasps the handling rods 9a and 9b, sets the detecting part 5 on the ground 17 at a distance H=30 mm to 40 mm as shown in FIG. 2, and starts the work.

If the capacitance sensor 29 detects a capacitance change, the oscillating circuit 59 provides a frequency change corresponding to the capacitance change to the frequency voltage converting circuit 61. The frequency voltage converting circuit 61 converts the input frequency change into a voltage change and provides the voltage change to the A/D converting circuit 63. The A/D converting circuit 63 converts the input voltage change into a binary digital signal and provides the signal to the MPU 65. The MPU 65 compares the input detected capacitance change with the stored reference capacitance change.

According to a result of the comparison, the MPU 65 detects the presence of the target buried object 19 such as a mine as shown in FIG. 2 and provides an output to the driving circuit 67. Then, the driving circuit 67 provides an output signal to the buzzer 55, which is activated to generate a warning sound that informs of the presence of the target buried object 19. In this way, the worker can correctly detect the presence of the target buried object 19 in the ground 17.

After the completion of the work, the OFF operation button 13b is pushed to inactivate the underground buried object detecting apparatus 1.

Figure 7:
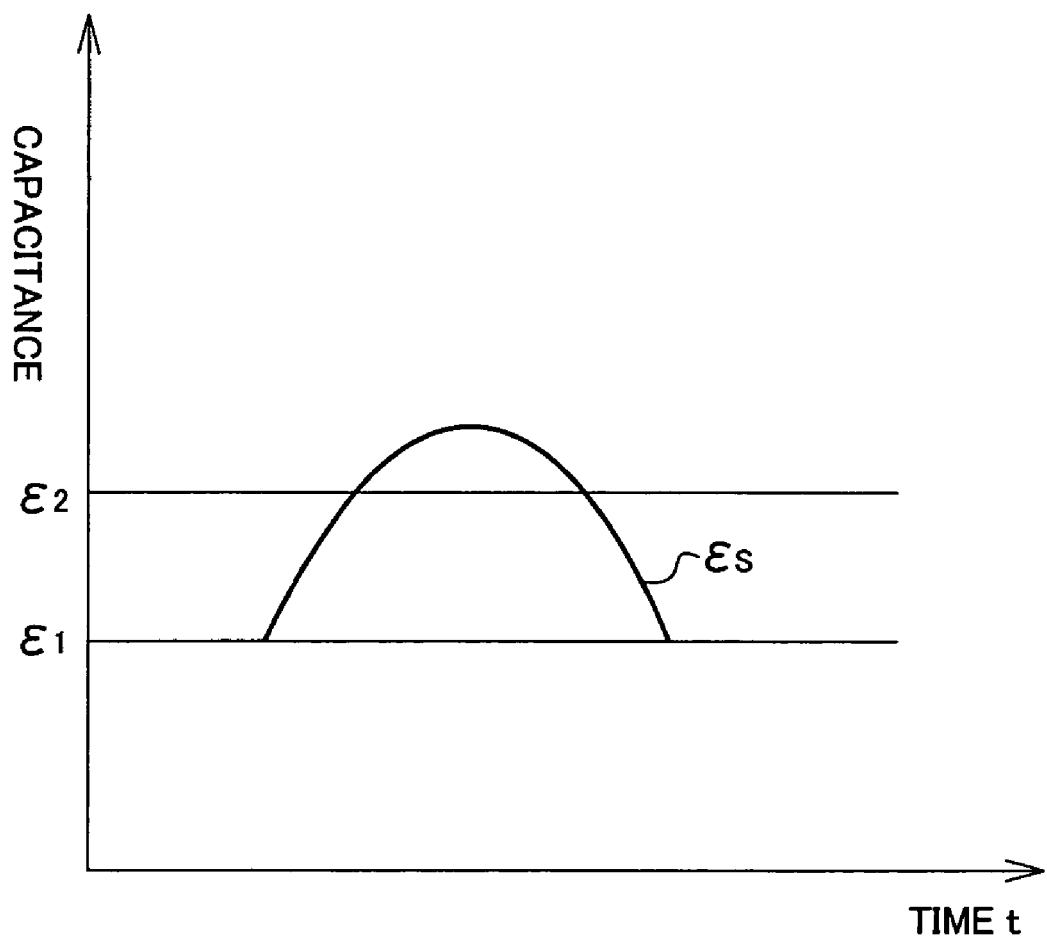
FIG. 7 is a graph showing capacitance changes according to the embodiment.

FIG. 7 is an exemplary graph showing the capacitance changes mentioned above. An abscissa of FIG. 7 represents time t and an ordinate indicates changes in capacitance $\epsilon$. $\epsilon 1$ is a capacitance change when the target buried object 19 is not in the ground 17. If the target buried object 19 is present, capacitance increases as indicated with $\epsilon s$ and reaches to $\epsilon 2$. Accordingly, the MPU 65 sets a reference capacitance $\epsilon 2$ based on $\epsilon 1$ and prestores the same. When the detected capacitance change $\epsilon s$ exceeds the reference capacitance $\epsilon 2$, the target buried object 19 will be detected. Namely, when the detected capacitance $\epsilon s$ exceeds the reference capacitance $\epsilon 2$, the MPU 65 provides an output signal to the driving circuit 67, which activates the buzzer 55.

The setting of the reference capacitance $\epsilon 2$ may depend on the kind of the target buried object 19. It is also possible to find the kind of the target buried object 19 based on an inner area surrounded by the capacitance change $\epsilon s$ and a state of the capacitance change $\epsilon s$.

In this way, the detecting apparatus can detect the presence of the target buried object 19 according to a capacitance change, and therefore, is capable of correctly detecting the target buried object 19 even if it is, for example, a mine made of resin.

Even if the target buried object 19 is a mine that detonates in response to electromagnetic waves, the mine detector 1 according to the embodiment can correctly detect the same without detonating it because the mine detector 1 of the embodiment employs a capacitance change for detection.

The capacitance sensor 29 consists of the measuring electrode 31 and ground electrode 33 each made of an annular conductive metal thin plate concentrically arranged on the bottom face of the base plate 27. By facing the base plate 27 to the ground and by optionally moving the same relative to the ground in back, forth, left, and right directions, the detector can correctly detect a capacitance change $\epsilon$ in the ground and can find the target buried object 19 at high precision.

The capacitance sensor 29 integrally has the terminal parts 35 and 37 passing through the base plate 27. The terminal parts 35 and 37 are electrically connected to the circuit 43 arranged on the top face of the base plate 27. As a result, the capacitance sensor 29 arranged on the bottom face of the base plate 27 can easily and electrically be connected to the circuit 43 on the top face of the base plate 27.

On the bottom face of the base plate 27, the resin plate 45 made of nonconductive resin material is arranged to cover the capacitance sensor 29. When the base plate 27 is faced to the ground so that the capacitance sensor 29 correctly detects a capacitance change $\epsilon$ in the ground, the resin plate 45 protects the capacitance sensor 29.

If the target buried object 19 is found in the ground, the buzzer 55 immediately informs a worker of the presence of the target buried object 19.

Figure 8:
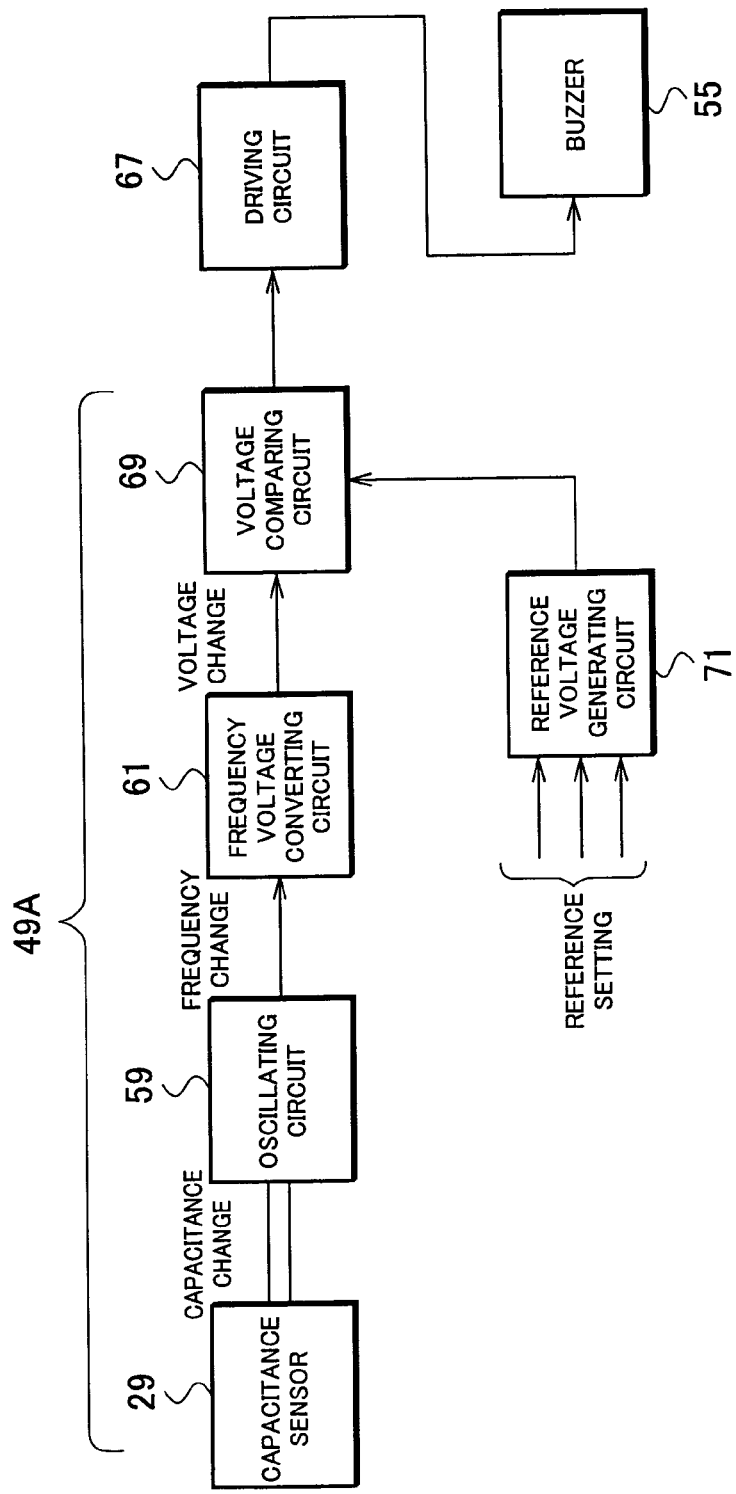
FIG. 8 is a block diagram showing a controller according to a modified embodiment of the present invention.

FIG. 8 shows a modification of the controller 49. In FIG. 8, parts corresponding to those of FIG. 6 are represented with like reference numerals.

The controller 49A of FIG. 8 employs a voltage comparing circuit 69 and a reference voltage generating circuit 71 instead of the A/D converting circuit 63 and MPU 65. The capacitance sensor 29, an oscillating circuit 59, a frequency voltage converting circuit 61, the voltage comparing circuit 69, and the reference voltage generating circuit 71 form the controller 49A.

The reference voltage generating circuit 71 generates a reference voltage to be compared in the voltage comparing circuit 69. The reference voltage to be generated corresponds to a reference capacitance $\epsilon 2$ to be set. Accordingly, the reference voltage generating circuit 71 of this embodiment serves as the reference value storing means.

The reference voltage generated by the reference voltage generating circuit 71 is sent to the voltage comparing circuit 69, which compares it with a voltage change corresponding to a detected capacitance change $\epsilon s$, and if a result of the comparison shows that $\epsilon s$ is above $\epsilon 2$ like FIG. 7, provides an output signal to the buzzer 55 through the driving circuit 67. Accordingly, this embodiment can also correctly detect the target buried object 19 and inform of the detection thereof with an alarming sound from the buzzer.

According to the above-mentioned embodiments, the underground buried object detecting apparatus 1 is grasped by a worker and is handled thereby. Ends of the handling rods 9a and 9b may be attached to a front end of a traveling carrier, so that the detecting part 5 may overhang in front of the carrier and so that the constant height H is kept between the detecting part 5 and the ground 17.

In addition, the bottom face of the detecting part 5 may be provided with a mat-like cushion that can disperse load. The mat-like cushion is set on the ground to keep the height H between the detecting part 5 and the ground.

The information means mentioned above may be not only the buzzer 55 but also a display that is arranged on the operation box 11, to display a capacitance change or a comparison result with numerals or graphs.

INDUSTRIAL APPLICABILITY

As mentioned above, the underground buried object detecting apparatus according to the present invention is appropriate to correctly detect the presence of a target buried object in the ground according to a comparison of capacitance changes without regard to the material of the target buried object which may be made of, for example, resin.

The invention claimed is:

1. An underground buried object detecting apparatus comprising:
   a base plate;
   a capacitance sensor attached to the base plate to be faced to the ground, to detect an underground capacitance change, the capacitance sensor having a measuring electrode in the form of a 360 degree annular ring and a ground electrode in the form of a 360 degree annular ring, concentrically arranged on a bottom face of the base plate and defining an annular space therebetween;
   reference value storing means for prestoring a reference capacitance indicative of a detected capacitance when no target buried object is present in the ground;
   operation means for comparing a detected capacitance change with the reference capacitance and detecting presence of a target buried object in the ground; and
   information means for receiving a signal from the operation means and informing of the presence of the target buried object.

2. The underground buried object detecting apparatus of claim 1, wherein the measuring electrode and the ground electrode are each made of an annular conductive metal plate.

3. The underground buried object detecting apparatus of claim 2, wherein:
   the capacitance sensor has integral terminals passing through the base plate; and
   the terminals are electrically connected to a circuit arranged on a top face of the base plate.

4. The underground buried object detecting apparatus of claim 2, wherein on the bottom face of the base plate, a nonconductive resin material is arranged to cover the capacitance sensor.

5. The underground buried object detecting apparatus of claim 3, wherein on the bottom face of the base plate, a nonconductive resin material is arranged to cover the capacitance sensor.

6. The underground buried object detecting apparatus of claim 1, wherein on the bottom face of the base plate, a nonconductive resin material is arranged to cover the capacitance sensor.

7. The underground buried object detecting apparatus of any one of claims 1 to 4, 5 and 6 wherein the information means is a buzzer to receive the signal from the operation means and inform of the presence of the target buried object with a warning sound.

* * * * *